United States Patent
Wodetzki et al.

(10) Patent No.: US 10,227,730 B2
(45) Date of Patent: Mar. 12, 2019

(54) PROCESS TO MANUFACTURE A MIXTURE OF P-ARAMID PULP WITH CHOPPED FIBERS, MIXTURE AND ITS USE

(71) Applicant: TEIJIN ARAMID GMBH, Wuppertal (DE)

(72) Inventors: Andreas Paul Benno Wodetzki, Sprockhövel (DE); Mikael Vertommen, Arnhem (NL)

(73) Assignee: TEIJIN ARAMID GMBH, Wuppertal (DE)

( * ) Notice: Subject to any disclaimer, the term of this patent is extended or adjusted under 35 U.S.C. 154(b) by 569 days.

(21) Appl. No.: 14/888,785

(22) PCT Filed: Mar. 28, 2014

(86) PCT No.: PCT/EP2014/056309
§ 371 (c)(1),
(2) Date: Nov. 3, 2015

(87) PCT Pub. No.: WO2014/177328
PCT Pub. Date: Nov. 6, 2014

(65) Prior Publication Data
US 2016/0076201 A1    Mar. 17, 2016

(30) Foreign Application Priority Data

May 3, 2013 (EP) .................................... 13166472

(51) Int. Cl.
| | | |
|---|---|---|
| *D21H 13/50* | (2006.01) | |
| *D21H 13/26* | (2006.01) | |
| *D21H 15/02* | (2006.01) | |
| *F16D 69/02* | (2006.01) | |
| *D21C 9/18* | (2006.01) | |
| *D21H 17/67* | (2006.01) | |
| *F16D 69/00* | (2006.01) | |

(52) U.S. Cl.
CPC .............. *D21H 13/26* (2013.01); *D21C 9/18* (2013.01); *D21H 13/50* (2013.01); *D21H 15/02* (2013.01); *D21H 17/67* (2013.01); *F16D 69/02* (2013.01); *F16D 2069/008* (2013.01)

(58) Field of Classification Search
CPC ...................................................... D21H 13/26
See application file for complete search history.

(56) References Cited

U.S. PATENT DOCUMENTS

| 5,084,136 A * | 1/1992 | Haines ..................... D04H 1/72 |
| | | 162/157.3 |
| 5,202,184 A | 4/1993 | Brierre et al. |
| 7,740,741 B2 * | 6/2010 | Levit ..................... C09K 3/1028 |
| | | 162/141 |
| 2005/0284595 A1* | 12/2005 | Conley .................. D21H 13/02 |
| | | 162/146 |
| 2007/0167101 A1* | 7/2007 | Naruse ................... D21H 13/26 |
| | | 442/414 |
| 2010/0206684 A1 | 8/2010 | Schmitt et al. |

FOREIGN PATENT DOCUMENTS

| WO | 2006/012040 A1 | 2/2006 |
| WO | 2007/006438 A1 | 1/2007 |
| WO | 2007/075575 A2 | 7/2007 |
| WO | 2011/062980 A2 | 5/2011 |

OTHER PUBLICATIONS

May 20, 2014 International Search Report issued in International Patent Application No. PCT/EP2014/056309.
Jul. 23, 2015 International Preliminary Report on Patentability issued in International Patent Application No. PCT/EP2014/056309.

\* cited by examiner

*Primary Examiner* — Anthony Calandra
(74) *Attorney, Agent, or Firm* — Oliff PLC

(57) ABSTRACT

A process to manufacture a mixture of p-aramid pulp with chopped fibers, wherein the process includes: providing a first mass that includes p-aramid pulp, providing a second mass that includes chopped fibers, guiding the first mass and the second mass into a mixing device, wherein the first mass and the second mass are mixed to yield a mixed mass, guiding the mixed mass on a dewatering device, whereupon the mixed mass is dewatered to yield a dewatered cake, guiding the dewatered cake, either directly or via a passage, through a cake breaker into a drying atmosphere to yield a dried intermediate, and guiding the dried intermediate, either directly or via a passage, through a homogenizing device into an opening device, wherein the dried intermediate is opened to arrive at an opened mixture of p-aramid pulp and chopped fibers. The mixture and its use are also described.

12 Claims, No Drawings

PROCESS TO MANUFACTURE A MIXTURE OF P-ARAMID PULP WITH CHOPPED FIBERS, MIXTURE AND ITS USE

BACKGROUND

The present invention pertains to the field of p-aramid pulp and its use.

Processes to manufacture p-aramid pulp by fibrillating chopped p-aramid fibers are known. Furthermore, it is known to use p-aramid pulp to manufacture friction materials, gasket materials and friction papers. P-aramid pulp exhibits a morphology which consists of stems of the chopped fibers from which the pulp was manufactured and of fibrils extending from each of the stems. In the mentioned products of p-aramid pulp its fibrils hold together the components of the respective compositions which constitute the respective product, for example the components constituting a friction material, like a brake pad. Said "holding together capability" of p-aramid pulp is characterized by a high filler retention which for p-aramid pulp of Type 1099 is the range from about 60% to about 85%.

WO 2006/012040 describes an acrylic and para-aramid pulp for use as reinforcing material comprising:
(a) irregularly shaped, acrylic fibrous structures comprising acrylonitrile units, the structures being 10 to 90 wt. % of the total solids;
(b) irregularly shaped, p-aramid fibrous structures being 10 to 90 wt. % of the total solids; and
(c) water being 4 to 60 wt. % of the entire pulp,
whereby the acrylic and the p-aramid fibrous structures having stalks and fibrils where the acrylic fibrils and/or stalks are substantially entangled with the p-aramid fibrils and/or stalks. WO 2006/012040 describes a process wherein p-aramid staple fibers are provided. Furthermore acrylic staple fibers are provided. Then the p-aramid staple fibers and the acrylic staple fibers are mixed at a solids concentration of 50 wt. % p-aramid staple fibers and 50 wt. % acrylic staple fibers to form a slurry. The slurry is pumped through a series of three refiners. The refiners simultaneously fibrillate, cut and masticate the acrylic fibers and the p-aramid staple fibers to form a refined slurry. This refined slurry is dewatered to a moisture content of 50 total wt. % for wet pulp. The wet pulp is pressed in a mechanical press to further remove water; and the pulp is then fluffed to better separate the wet pulp. The fluffed wet pulp is then dried to approximately 8 wt. % moisture.

WO 2011/062980 describes a paper comprising carbon floc, p-aramid floc, p-aramid pulp, and m-aramid fibrids. The composition of the paper is 40 wt. % carbon fiber floc, 15 wt. % p-aramid floc, 30 wt. % of p-aramid pulp, and 15 wt. % m-aramid fibrids.

However, there is an everlasting demand to increase the green strength of p-aramid pulp and consequently the strength of the products containing p-aramid pulp.

BRIEF SUMMARY

Therefore, the problem underlying the present invention is to provide a process resulting in a product which exhibits a higher green strength than p-aramid pulp and at the same time exhibits a kaolin filler retention which is at least higher than that of chopped fibers.

Said problem is solved by a process to manufacture a mixture of p-aramid pulp with chopped fibers, wherein said process comprises the following steps:

a) Providing a first mass, wherein the first mass comprises p-aramid pulp,
b) providing a second mass, wherein the second mass comprises chopped fibers,
c) guiding the first mass and the second mass into a mixing device, wherein said first mass and said second mass are mixed to yield a mixed mass,
d) guiding the mixed mass on a dewatering device, whereupon the mixed mass is dewatered to yield a dewatered cake,
e) guiding the dewatered cake
   i) either directly
   ii) or via a passage through a cake breaker into a drying atmosphere to yield a dried intermediate, and
f) guiding the dried intermediate
   i) either directly
   ii) or via a passage through a homogenizing device into an opening device, wherein the dried intermediate is opened to arrive at an opened mixture of p-aramid pulp and chopped fibers.

Surprisingly, the mixture obtained by the process according to the present invention, —which may be called "first process"—exhibits a kaolin filler retention which is considerably higher than that of the chopped fibers which were used to prepare the mixture, while the green strength is considerably, i.e. up to 100%, higher than that of the p-aramid pulp which was used to prepare the mixture. In preferred embodiments the mixture obtained by the process according to the present invention exhibits a green strength which is considerably higher than that of the p-aramid pulp which was used to prepare the mixture and at the same time exhibits a kaolin filler retention which is only slightly lower than that of the p-aramid pulp which was used to prepare the mixture or even equals that of the p-aramid pulp which was used to prepare the mixture.

DETAILED DESCRIPTION

Within the scope of the present invention the term p-aramid pulp means a pulp obtained with the aid of a refining process from p-aramid fibers. Within the scope of the present invention the term "p-aramid fibers" means fibers produced from p-aramid as the fiber-forming polymer, and the term "p-aramid" means a polymer obtained by the polycondensation of a para-oriented aromatic diamine and a para-oriented dicarboxylic acid halide of which recurring units have amide bonds, and preferably at least 95%, more preferred at least 99%, and most preferred 100% of said amide bonds are located in the para-oriented positions of the aromatic ring. In an especially preferred embodiment of the process according to the present invention the aramid pulp comprised by the first mass, which is provided in step a), is produced with the aid of a refining process from fibers with poly(p-phenylene terephthalamide) as the fiber forming polymer. Said polymer results from the mol:mol polymerization of p-phenylene diamine and terephthalic acid dichloride. Such fibers can be obtained under the trade name Twaron® from Teijin Aramid (NL).

Within the scope of the present invention the term "a first mass" means the first ingredient which has to be provided in the process according to the present invention. The first mass provided in step a) of the process according to the present invention may comprise, or may consist of dry p-aramid pulp. Preferably the first mass comprises or consists of a suspension of p-aramid pulp in water.

Within the scope of the present invention the term "a second mass" means the second ingredient which has to be provided in the process according to the present invention. The second mass provided in step b) of the process according to the present invention may comprise, or may consist of dry chopped fibers. Preferably the second mass comprises or consists of a suspension of chopped fibers in water.

Within the scope of the present invention the term "chopped fibers" means fibers of limited length, and, therefore, is a synonym for "staple fibers".

In step c) of the process according to the present the first mass and the second mass are guided into a mixing device, for example into a tank equipped with a mixing means like a stirrer. In the mixing device said first mass and said second mass are mixed to yield a mixed mass. If in a preferred embodiment of the process according to the present invention said first mass as provided in step a) comprises or preferably consists of a suspension of p-aramid pulp in water and said second mass as provided in step b) comprises or preferably consists of a suspension of chopped fibers in water, a preferred embodiment of mixing said first mass with said second mass is stirring.

In step d) of the process according to the present invention the mixed mass resulting from step c) is guided on a dewatering device which in one preferred embodiment is a belt filter, and in another preferred embodiment is a sieve. Step d) results in a cake, preferably in a belt-filter cake or in a sieve table cake.

In step e) of the process according to the present invention the cake resulting from step d) is processed into a dried intermediate which, if step e) i) is practiced, has the shape of a dried cake or, if step e) ii) is practiced, the shape of dried crumbs.

In step f) of the process according to the present invention the dried intermediate is guided
i) either directly
ii) or via a passage through a homogenizing device,
into an opening device, wherein the dried intermediate is opened to arrive at an opened mixture of p-aramid pulp with chopped fibers. Step f) i) is practiced, if the dried intermediate resulting from step e) is already homogenous mainly regarding its moisture content. If not, step f) ii) is practiced, wherein homogenizing of the dried intermediate resulting from step e) in the homogenizing device achieves a dried intermediate with a homogenous moisture content. Therefore, for the homogenizing device any apparatus can be used which is capable to get rid of an in-homogenous distribution of moisture in the dried intermediate resulting from step e).

Within the scope of the present invention the wording "the dried intermediate is opened to arrive at an opened mixture of p-aramid pulp with chopped fibers" means the following:

The dried intermediate resulting from step e) contains p-aramid pulp and chopped fibers in a morphology (I), wherein the p-aramid pulp and the chopped fibers are entangled with one another, and wherein the means for entanglement are represented by the fibrils which extend from the stems of the p-aramid pulp, and possibly by the stems of the pulp. The latter applies, because the stems of the pulp became kinked during the refining process to manufacture the pulp. Therefore, also the kinked stems of the p-aramid pulp can wrap around the chopped fibers. In the opening device of step f) said entangled morphology is opened into a less entangled morphology (II).

In a preferred embodiment of the process according to the present invention the p-aramid pulp comprised by the first mass is obtained by at least one refining step.

In a further preferred embodiment of the process according to the present invention the p-aramid pulp comprised by the first mass has a specific surface area in the range from about 5 $m^2/g$ to 15 $m^2/g$, even more preferred in the range from about 8 $m^2/g$ to 15 $m^2/g$.

In a further preferred embodiment of the process according to the present invention in step d) the mixed mass is guided via a passage through a refiner on the dewatering device.

In a further preferred embodiment of the process according to the present invention the p-aramid pulp comprised by the first mass exhibits a surface which is coated with functional groups, so that said p-aramid pulp for example is an antistatic pulp.

In a further preferred embodiment of the process according to the present invention the material forming the chopped fibers comprised by the second mass comprises, preferably consists of, p-aramid or carbon. Furthermore, the material forming the chopped fibers comprised by the second mass may comprise a polyacrylonitrile (PAN), a glass, a steel, a polyethylene or a mineral which preferably comprises oxides like $SiO_2$, $Al_2O_3$, CaO, MgO, and $Fe_2O_3$.

In a further preferred embodiment of the process according to the present invention the chopped fibers comprised by the second mass exhibit a single length. This is the case, if the chopped fibers comprised by the second mass have been obtained by cutting a yarn with a single cutting length. Preferably, the chopped fibers comprised by the second mass have a single length, wherein the single length has a value in the range from 2 mm to 12 mm, more preferred in the range from 3 mm to 9 mm, and especially preferred in the range from 5 mm to 7 mm.

Alternatively, in a further preferred embodiment of the process according to the present invention the chopped fibers comprised by the second mass exhibit a length distribution, for example a random length distribution. This is the case, if the chopped fibers comprised by the second mass have been obtained
 from recycling articles which contained fibers, e.g. aramid fibers, or staple fibers which have been cut for example in a shredder or in a guillotine cutter to arrive at chopped fibers having such length distribution or
 from disrupting a yarn, for example an aramid yarn.

Preferably, the average value of the length distribution, which may be a random length distribution, is in the range from 2 mm to 12 mm, more preferred in the range from 3 mm to 9 mm, and especially preferred in the range from 5 mm to 7 mm.

In a preferred embodiment of the process according to the present invention the chopped fibers comprised by the second mass exhibit a cross-section having an irregular shape.

In a further preferred embodiment of the process according to the present invention the chopped fibers comprised by the second mass exhibit a regular shape, which may be non-circular, like a multilobal shape, or circular.

Preferably, the chopped fibers comprised by the second mass exhibit a circular cross-section, and the circular cross-section has a diameter, wherein the diameter is in the range from 4 µm to 50 µm, especially preferred in the range from 5 µm to 20 µm, and most preferred in the range from 6 µm to 15 µm.

In a further preferred embodiment of the process according to the present invention the chopped fibers comprised by the second mass exhibit a non-circular regular cross-section or an irregular cross-section, and the non-circular regular cross-section or the irregular cross-section exhibit a mean diameter, wherein the mean diameter is in the range from 4 µm to 50 µm, especially preferred in the range from 5 µm to 20 µm, and most preferred in the range from 6 µm to 15 µm.

In a further preferred embodiment of the process according to the present invention the first mass provided in step a) and/or the second mass provided in step b) and/or the mixed mass yielded from step c) comprises a filler. Said filler is neither a chopped fiber nor a fibrillated chopped fiber. Preferably the filler is selected from barium sulfate, calcium carbonate, mica, vermiculite, alkali metal titanates, molybdenum trioxide, cashew dust, rubber dust, graphite, metal sulfides, metal oxides, metal silicates or mixtures thereof.

In a further preferred embodiment of the process according to the present invention the first mass provided in step a) and/or the second mass provided in step b) and/or the mixed mass yielded from step c) comprises at least one dispersion agent, wherein the dispersion agent preferably is
- a polymer selected from the group consisting of nonionic polymers, e.g. from polyethylene oxides or polyacrylamides, or
- a surfactant or a surfactant like polymer, e.g. a poloxamer, i.e. a block copolymer of ethylene oxide and propylene oxide, or
- a polymer selected from the group consisting of anionic polymers, e.g. a salt of polyacrylic acid or a copolymer of acrylic acid and acrylamide.

In a further preferred embodiment of the process according to the present invention the dewatered cake resulting in step d) is dewatered on the dewatering device to an extent which is sufficient that a dewatered cake is formed.

In a further preferred embodiment of the process according to the present invention the dried intermediate resulting in step e) exhibits a water content in the range from 0 wt. % to 20 wt. %, especially preferred from 3 wt. % to 10 wt. %.

In a further preferred embodiment of the process according to the present invention the opening device used in step f) is an impact mill or a mill using turbulent air or a high shear/high agitating mixer.

In a further preferred embodiment of the process according to the present invention the mixture resulting from step f) exhibits a moisture content in the range from 0 wt. % to 20 wt. %, especially preferred from 3 wt. % to 10 wt. %.

In a further preferred embodiment of the process according to the present invention the mixture of p-aramid pulp with chopped fibers resulting from step f) is subjected to packaging, wherein packaging comprises compacting said mixture in a fiber compacter resulting in a compacted mixture, pressing the compacted mixture into a bale, and sealing the bale.

In a further preferred embodiment of the process according to the present invention the steps a) to f) are conducted in a single continuous process.

In a further preferred embodiment of the process according to the present invention the process consists of the steps a) to f).

In a further preferred embodiment of the process according to the present invention the process is conducted in a sequence as denoted by steps a) to f).

Furthermore, a mixture of p-aramid pulp with chopped fibers obtainable from the process according to the present invention is characterized in that the mixture exhibits a content of p-aramid pulp in the range from 50 wt. % to 95 wt. %, and a content of chopped fibers in the range from 5 wt. % to 50 wt. %, and the mixture exhibits a green strength ranging from 1.0 to 5.0 mJ/mm$^2$ and a kaolin filler retention ranging from 15 to 95%. Said mixture may be called "first mixture".

In a preferred embodiment of the mixture according to the present invention said mixture exhibits a green strength ranging from 1.0 to 5.0 mJ/mm$^2$ and a kaolin filler retention ranging from 15 to 35%.

In a further preferred embodiment of the mixture according to the present invention said mixture exhibits a green strength ranging from 1.5 to 5.0 mJ/mm$^2$ and a kaolin filler retention ranging from 35 to 95%.

In a preferred embodiment the mixture according to the present invention exhibits a content of p-aramid pulp in the range from 70 wt. % to 90 wt. %, and a content of chopped fibers in the range from 10 wt. % to 30 wt. %.

Surprisingly, the mixture according to the present invention exhibits a kaolin filler retention which is considerably higher than that of the chopped fibers which were used to prepare the mixture, while the green strength is considerably higher than that of the p-aramid pulp which was used to prepare the mixture. In preferred embodiments the mixture according to the present invention exhibits a green strength which is considerably higher than that of the p-aramid pulp which was used to prepare the mixture and at the same time exhibits a kaolin filler retention which is only slightly lower than that of the p-aramid pulp which was used to prepare the mixture or even equals that of the p-aramid pulp which was used to prepare the mixture.

Furthermore, the use of the mixture according to the present invention or of the mixture obtained from the process according to the present invention to manufacture friction materials, gasket materials and friction paper is part of the present invention. Said use may be called "first use".

The present invention also provides a process to manufacture a mixture of p-aramid pulp with p-aramid chopped fibers, wherein said process comprises the following steps:
a) Providing a first mass, wherein the first mass comprises p-aramid pulp,
b) providing a second mass, wherein the second mass comprises p-aramid chopped fibers,
c) guiding the first mass and the second mass into a mixing device, wherein said first mass and said second mass are mixed to yield a mixed mass, and
d') guiding the mixed mass through a refiner and thereafter on a dewatering device, whereupon the mixed mass is dewatered to yield a dewatered cake.

Said process may be called "second process".

In the above process ("second process") the meaning of the terms "p-aramid pulp", p-aramid fibers", "chopped fibers", "first mass", and "second mass" is analogously the same as already explained for the first process. Furthermore, the preferred embodiments for the providing steps a) and b), for the mixing step c), and for the p-aramid pulp which were already described for the first process also apply to the second process.

In a preferred embodiment of the process according to the present invention the mixed mass resulting from step c) is a dispersion of p-aramid pulp and p-aramid chopped fibers in water, so that the mixed mass resulting from step c) has a total weight $w_{mm}=w_1+w_2+w_3$, wherein $w_1$ is the weight of p-aramid pulp in g, $w_2$ is the weight of p-aramid chopped fibers in g, and $w_3$ is the weight of water in g. Said dispersion exhibits a solids-concentration $c_{mm}[(w_1+w_2)/(w_1+w_2+w_3)] \cdot 100(\%)$. The solids-concentration $c_{mm}$ preferably ranges from 0.1 wt. % to 5 wt. %, and especially preferred from 1 wt. % to 3 wt. %.

If in a preferred embodiment of the first process according to the present invention, wherein the mixed mass resulting from step c) is a dispersion of p-aramid pulp and chopped fibers in water, analogously the same preferred and especially preferred ranges for $c_{mm}$ apply with the only difference that $w_2$ is the weight of chopped fibers in g.

In step d') of the process according to the present invention the mixed mass is guided through a refiner. This means that the p-aramid pulp and the p-aramid chopped fibers comprised by the mixed mass are subjected in the refiner to fibrillation. Before entering the refiner, the p-aramid pulp is already highly fibrillated. During fibrillation in the refiner, the p-aramid pulp becomes even more fibrillated. So, after refining, the p-aramid pulp is even higher fibrillated. In contrast, the p-aramid chopped fibers do not exhibit fibrils before entering the refiner. During fibrillation in the refiner the p-aramid chopped fibers become fibrillated. So, after refining, the p-aramid chopped fibers are fibrillated. However, in comparison with the highly fibrillated p-aramid pulp, the p-aramid fibers are much less fibrillated, and, therefore can be designated as slightly fibrillated p-aramid chopped fibers. Consequently, in step d') the mixed mass that leaves the refiner and thereafter is guided on the dewatering device, whereupon the mixed mass is dewatered, yields a dewatered cake, which contains p-aramid pulp and slightly fibrillated p-aramid chopped fibers.

In a preferred embodiment of the process according to the present invention step d') is followed by step e') and f'). This means that e') the dewatered cake resulting from step d') is guided
  i') either directly
  ii') or via a passage through a cake breaker into a drying atmosphere to yield a dried intermediate, and
f') the dried intermediate is guided
  i') either directly
  ii') or via a passage through a homogenizing device into an opening device, wherein the dried intermediate is opened to arrive at an opened mixture of p-aramid pulp with p-aramid chopped fibers.

The dried intermediate resulting from step e') contains p-aramid pulp and slightly fibrillated p-aramid chopped fibers in a morphology (III), wherein the p-aramid pulp and the slightly fibrillated p-aramid chopped fibers are entangled with one another, and wherein the means for entanglement are represented by the fibrils which extend from the stems of the p-aramid pulp, possibly by the kinked stems of the p-aramid pulp as already explained, and by the fibrils extending from the slightly fibrillated p-aramid chopped fibers. In the opening device of step f') said entangled morphology is opened into a less entangled morphology (IV).

The present invention also provides a mixture of p-aramid pulp with p-aramid chopped fibers obtainable from the process according to the present invention, i.e. from the second process, wherein the mixture exhibits a content of p-aramid pulp in the range from 50 wt. % to 95 wt. %, and a content of p-aramid chopped fibers in the range from 5 wt. % to 50 wt. % and wherein the mixture exhibits a green strength ranging from 1 to 5 mJ/mm² and a kaolin filler retention ranging from 15 to 95%. Said mixture may be called "second mixture".

Surprisingly, said mixture obtained by the process according to the present invention, wherein also steps e') and f') have been practiced, exhibits a kaolin filler retention which is considerably, i.e. up to 100%, higher than that of the p-aramid chopped fibers which were used to prepare the mixture, while the green strength is considerably higher than that of the p-aramid pulp which was used to prepare the mixture. In preferred embodiments the mixture obtained by the process according to the present invention exhibits a green strength which is considerably higher than that of the p-aramid pulp which was used to prepare the mixture and at the same time exhibits a kaolin filler retention which is only slightly lower than that of the p-aramid pulp which was used to prepare the mixture or even equals that of the p-aramid pulp which was used to prepare the mixture.

Furthermore, it was surprisingly found that, if the second mixture resulting from the second process, wherein also steps e') and f') have been practiced, is incorporated in model formulations of brake pads, gasket materials and friction paper, said second mixture is more homogenously dispersed in said formulations than a corresponding first mixture according to the present invention, wherein the p-aramid chopped fibers have not been co-refined with the p-aramid pulp. The increased dispersibility of said second mixture reduces the waste during production of brake pads, gasket materials and friction paper, and increases the quality of a brake pad, a gasket material and a friction paper containing said mixture in terms of reduction of amount of agglomerates, and improved strength. Brake pads produced in a real NAO (Non Asbestos Organic) brake pad formulation comprising for example 6 wt. % of a mixture according to the invention for example exhibit an improved dust binding, a higher pre-mold strength and a higher specific shear strength if compared to comparative brake pads which differ from the former brake pads only in that they comprise 100% p-aramid pulp without any chopped fibers. Furthermore, during the production of brake pads produced in a real NAO brake pad formulation comprising for example 6 wt. % of a mixture according to the invention only slight demixing and only few agglomerates are observed.

In a preferred embodiment of the mixture according to the present invention, i.e. of the second method, the mixture exhibits a green strength ranging from 1.0 to 5.0 mJ/mm² and a kaolin filler retention ranging from 15 to 35%.

In a further preferred embodiment of the mixture according to the present invention, i.e. of the second method, the mixture exhibits a green strength ranging from 1.0 to 5.0 mJ/mm² and a kaolin filler retention ranging from 35 to 95%.

Furthermore, the use of the mixture according to the present invention (second mixture) or of the mixture obtained from the process according to the present invention (second process) to manufacture friction materials, gasket materials and friction paper, is also part of the present invention.

In a further preferred embodiment of the process according to the present invention the steps a) to d') and optionally e') and f') are conducted in a single continuous process.

In a further preferred embodiment of the process according to the present invention the process consists of the steps a) to d') and optionally e') and f').

In a further preferred embodiment of the process according to the present invention the process is conducted in a sequence as denoted by steps a) to d') and optionally e') and f').

In short, the first and second process according to the present invention can be summarized in one process to manufacture a mixture of p-aramid pulp with chopped fibers or with slightly fibrillated chopped fibers, wherein said process comprises the following steps:

a) Providing a first mass, wherein the first mass comprises p-aramid pulp,
b) providing a second mass, wherein the second mass comprises chopped fibers,
c) guiding the first mass and the second mass into a mixing device, wherein said first mass and said second mass are mixed to yield a mixed mass, d) guiding the mixed mass
  i) either directly or
  ii) via a passage through a refiner on a dewatering device, whereupon the mixed mass is dewatered to yield a dewatered cake,
e) guiding the dewatered cake
  i) either directly
  ii) or via a passage through a cake breaker into a drying atmosphere to yield a dried intermediate,
f) guiding the dried intermediate
  i) either directly
  ii) or via a passage through a homogenizing device, into an opening device, wherein the dried intermediate is opened to arrive at an opened mixture of p-aramid pulp with chopped fibers or with slightly fibrillated chopped fibers.

In the present invention the following measuring methods are used:

The specific surface area SSA [m²/g] is determined by the BET specific surface area method, wherein the adsorption of nitrogen is measured with the aid of a Tristar 3000 apparatus manufactured by Micro metrics. Before the BET-measurement the samples were dried at 200° C. for 30 minutes, under flushing with nitrogen.

The length weighted length $LL_{0.25}$ [mm] is determined by the Pulp Expert™ FS apparatus which was calibrated with samples of pulp with known lengths. The length weighted length $LL_{0.25}$ [mm] is a length-weighted average length wherein particles are included having a length>250 µm, i.e. >0.25 mm.

The kaolin filler retention [%] is determined as described in the following: A mixture of 97 wt.-% Kaolin (Laude SP20) and 3 wt.-% of the sample to be tested (i.e. pulp or {pulp+chopped fiber}—mixture or {pulp+slightly fibrillated chopped fiber}—mixture) is prepared on a high-speed vertical mixer. 20 g of said mixture are sieved on a riddle sifter device using a 250 mesh sieve. The remaining material on the sieve given as percentage of the initial amount is determined and is the kaolin filler retention [%].

The green strength [mJ/mm²] is determined as described in the following: A mixture of 97% Kaolin (Laude SP20) and 3% of the sample to be tested is prepared on a high speed vertical mixer. 10 g of said mixture are molded at 70 bar to a rod with a thickness between 7.5 and 11 mm and a width of 15 mm. The rod is fractured on a pendulum ram impact testing device perpendicular to its main axis and the areal-specific energy, which is necessary for said fracture, is determined as the green strength in units of [mJ/mm²].

The bulk volume $V_{bulk}$ given in [ml/g] is determined as described in the following: A mixture of 97% Kaolin (Laude SP20) and 3% of the sample to be tested is prepared on a high-speed vertical mixer. 30 g of said mixture is poured into a graduated cylinder and the bulk volume $V_{bulk}$ is calculated from the filling volume $V_{fill}$ [ml] according to equation (1)

$$V_{bulk}[ml/g] = V_{fill}[ml]/30[g] \quad (1).$$

The jolting volume $V_{jolting}$ given in [ml/g] is determined as described in the following: After determination of the bulk volume, a jolt piston (50 gram) is applied carefully into the graduated cylinder on the surface of the 30 g sample, of which the bulk volume was determined, and the cylinder is fixed on a jolter. The jolting volume $V_{jolting}$ is calculated from the filling volume after 250 strokes, $V_{fill(250)}$ [ml], according to equation (2)

$$V_{jolting}[ml/g] = V_{fill(250)}[ml]/30[g] \quad (2).$$

EXAMPLE 1: MANUFACTURE OF MIXTURES CONSISTING OF 50/50 [WT.-%/WT.-%] OF P-ARAMID PULP AND P-ARAMID CHOPPED FIBERS WITH DIFFERENT DIAMETERS

EXAMPLE 1A 1.4 kg of p-aramid pulp (Twaron® type 1099 from Teijin Aramid BV, NL) are added to 125 liter water and stirred for two minutes. Then 1.4 kg of p-aramid chopped fibers of 6 mm in length and with a diameter $d_{chopped\ fibers}$ of 12 µm (Twaron® type 1080 from Teijin Aramid BV, NL) are added and the (pulp+chopped fibers+water)—mixture is stirred for two minutes. The resulting suspension is then dewatered on a sieve table to yield a dewatered cake. The dewatered cake is dried in an oven overnight at 105° C. to yield a dried cake. 800 g of the dried cake is then opened in a Lodige high-shear mixer for 4 minutes resulting in a mixture A, the properties of which are shown in table 1.

EXAMPLE 1B

This example is performed as example 1a) with the only difference that the p-aramid chopped fibers exhibit a diameter $d_{chopped\ fibers}$ 9 µm (Twaron® type D 2075 from Teijin Aramid BV, NL). The properties of the resulting mixture B are shown in table 1.

COMPARATIVE EXAMPLE 1C

This example is performed as example 1a) with the difference that 2.8 kg of p-aramid pulp (Twaron® type 1099 from Teijin Aramid BV, NL) without any chopped fibers were suspended in water, dewatered, dried and opened as described in example 1a). The properties of the resulting pulp P1 are shown in table 1.

TABLE 1

| Example | Description | $LL_{0.25}$ [mm] | Kaolin filler Retention [%] | Green strength [mJ/mm²] | Bulk volume [ml/g] | Jolting volume [ml/g] |
|---|---|---|---|---|---|---|
| 1c) | 100% pulp P1 | n.m. | 85 | 1.4 | 4.4 | 2.5 |
| 1a) | mixture A $d_{cf}$ = 12 µm | 2.6 | 76 | 2.2 | 5.3 | 2.6 |
| 1b) | mixture B $d_{cf}$ = 9 µm | 2.5 | 75 | 2.7 | n.m. | n.m. |

Table 1 shows that both mixture A and mixture B exhibit a green strength which is considerably higher than the green strength of 100% pulp, and a filler retention which is considerably higher than the filler retention of chopped p-aramid fibers and which is only slightly lower than the filler retention of p-aramid pulp P1.

EXAMPLE 2: MANUFACTURE OF MIXTURES CONSISTING OF 50/50 [WT.-%/WT.-%] OF P-ARAMID PULP AND SLIGHTLY FIBRILLATED P-ARAMID CHOPPED FIBERS WITH DIFFERENT DEGREES OF FIBRILLATION

EXAMPLE 2A 1.4 kg of p-aramid pulp (Twaron® type 1099 from Teijin Aramid BV, NL) are added to 125 liter water and stirred for two minutes. Then 1.4 kg of p-aramid chopped fibers of 6 mm in length and 12 μm in diameter (Twaron® type 1080 from Teijin Aramid BV, NL) are added. The resulting suspension is passed through a Sprout-Bauer 12" lab refiner, wherein a refining energy of 40 kW is applied yielding a refined suspension. The refined suspension is mixed for two minutes and is then dewatered on a sieve table to yield a dewatered cake. The dewatered cake is dried in an oven overnight at 105° C. to yield a dried cake. 800 g of the dried cake is then opened in a Lödige high-shear mixer for 4 minutes resulting in a mixture C, the properties of which are shown in table 2.

EXAMPLE 2B

This example is performed as example 2a) with the only difference that in the refiner a refining energy of 20 kW is applied. The properties of the resulting mixture D are shown in table 2.

TABLE 2

| Example | Description | $LL_{0.25}$ [mm] | Kaolin filler Retention [%] | Green strength [mJ/mm$^2$] | Bulk volume [ml/g] | Jolting volume [ml/g] |
|---|---|---|---|---|---|---|
| 2a) | mixture C refining energy 40 kW | 1.5 | 78 | 1.9 | 4.3 | 2.5 |
| 2b) | mixture D refining energy 20 kW | 2.1 | 71 | 2.2 | 5.0 | 2.5 |

Table 2 shows that both mixture C and mixture D exhibit a green strength which is considerably higher than the green strength of 100% pulp (see P1 in example 1c)), and a filler retention which is considerably higher than the filler retention of chopped p-aramid fibers and which is only slightly lower than the filler retention of p-aramid pulp.

EXAMPLE 3: MANUFACTURE OF A MIXTURE CONSISTING OF 72/28 [WT.-%/WT.-%] OF P-ARAMID PULP AND P-ARAMID CHOPPED FIBERS WITH LOW DIAMETER 2.02 kg of p-aramid pulp (Twaron® type 1099 from Teijin Aramid BV, NL) are added to 125 liter water and stirred for two minutes. Then 0.78 kg of p-aramid chopped fibers of 6 mm in length and 9 μm in diameter (Twaron® type D2075 from Teijin Aramid BV, NL) are added and the (pulp+chopped fibers+water)—mixture is stirred for two minutes. The resulting suspension is then dewatered on a sieve table to yield a dewatered cake. The dewatered cake is dried in an oven overnight at 105° C. to yield a dried cake. 800 g of the dried cake is then opened in a Lödige high-shear mixer for 4 minutes resulting in a mixture E, the properties of which are shown in table 3.

TABLE 3

| Example | Description | $LL_{0.25}$ [mm] | Kaolin filler Retention [%] | Green strength [mJ/mm$^2$] | Bulk volume [ml/g] | Jolting volume [ml/g] |
|---|---|---|---|---|---|---|
| 3 | mixture E $d_{cf}$ = 9 μm | 1.8 | 83 | 2.3 | n.m. | n.m. |

Table 3 shows that mixture E exhibits a green strength which is considerably higher than the green strength of 100% pulp (see P1 in example 1c)), and a filler retention which almost equals the filler retention of p-aramid pulp.

EXAMPLE 4: MANUFACTURE OF MIXTURES CONSISTING OF 50/50 [WT.-%/WT.-%] OF P-ARAMID PULP AND (SLIGHTLY FIBRILLATED) P-ARAMID CHOPPED FIBERS WITH DIAMETER=12 μM

EXAMPLE 4A 2.25 kg of p-aramid pulp (Twaron® type 3091 from Teijin Aramid BV, NL) are added to 200 liter water and stirred for two minutes. Then 2.25 kg of p-aramid chopped fibers of 6 mm in length and 12 μm in diameter (Twaron® type 1080 from Teijin Aramid BV, NL) are added and the (pulp+chopped fibers+water)—mixture is stirred for two minutes. The resulting suspension is then dewatered on a sieve table to yield a dewatered cake. The dewatered cake is dried in an oven overnight at 105° C. to yield a dried cake. 800 g of the dried cake is then opened in a Lodige high-shear mixer for 4 minutes resulting in a mixture F, the properties of which are shown in table 4.

EXAMPLE 4B 2.25 kg of p-aramid pulp (Twaron® type 3091 from Teijin Aramid BV, NL) are added to 200 liter water and stirred for two minutes. Then 2.25 kg of p-aramid chopped fibers of 6 mm in length and 12 μm in diameter (Twaron® type 1080 from Teijin Aramid BV, NL) are added. The resulting suspension is passed through a Sprout-Bauer 12" refiner, wherein a refining energy of 40 kW is applied yielding a refined suspension. The refined suspension is mixed for two minutes and is then dewatered on a sieve table to yield a dewatered cake. The dewatered cake is dried in an oven overnight at 105° C. to yield a dried cake. 800 g of the dried cake is then opened in a Lödige high-shear mixer for 4 minutes resulting in a mixture G, the properties of which are shown in table 4.

EXAMPLE 4C

Example 4c) is performed as example 4a) with the only difference that a refining energy of 20 kW is applied resulting in a mixture H, the properties of which are shown in table 4.

COMPARATIVE EXAMPLE 4D

Comparative example 4d) is performed as example 4a) with the difference that that 4.5 kg of p-aramid pulp (Twaron® type 3091 from Teijin Aramid BV, NL) without any chopped fibers were suspended in water, dewatered, dried and opened as described in example 6a). The properties of the resulting pulp P2 are shown in table 4.

TABLE 4

| Example | Description | LL$_{0.25}$ [mm] | SSA [m$^2$/g] | Kaolin filler Retention [%] | Green strength [mJ/mm$^2$] | Bulk volume [ml/g] | Jolting volume [ml/g] |
|---|---|---|---|---|---|---|---|
| 4d) | 100% pulp P2 | 0.8 | 9.4 | 84 | 1.3 | 4.3 | 2.5 |
| 4a) | mixture F | 2.1 | n.m. | 71 | 2.2 | 5.4 | 2.6 |
| 4b) | mixture G refining energy 40 kW | 1.3 | 5.7 | 73 | 1.7 | 4.1 | 2.4 |
| 4c) | mixture H refining energy 20 kW | 2.1 | 5.4 | 74 | 2.6 | 5.3 | 2.7 |

Table 4 shows that mixtures F, G and H exhibit a green strength which is considerably higher than the green strength of 100% p-aramid pulp P2, and a filler retention which is only slightly lower than the filler retention of p-aramid pulp P2.

The invention claimed is:

1. A process to manufacture a mixture of p-aramid pulp with chopped fibers, wherein the process comprises:
   a) providing a suspension comprising p-aramid pulp in water,
   b) providing a suspension comprising chopped fibers in water, wherein the chopped fibers comprise p-aramid or carbon,
   c) guiding the suspension from a) and the suspension from b) into a mixing device, wherein the suspensions are mixed to yield a mixed mass having a solid content of p-aramid pulp and chopped fibers in the range of from 50 wt. % to 95 wt. % of p-aramid pulp and from 5 wt. % to 50 wt. % of chopped fibers,
   d) guiding the mixed mass on a dewatering device, whereupon the mixed mass is dewatered to yield a dewatered cake,
   e) guiding the dewatered cake either
      i) directly, or
      ii) via a passage through a cake breaker
      into a drying atmosphere to yield a dried intermediate, and
   f) guiding the dried intermediate either
      i) directly, or
      ii) via a passage through a homogenizing device
      into an opening device, wherein the dried intermediate is opened to arrive at an opened mixture of p-aramid pulp and chopped fibers,
   wherein the chopped fibers in the suspension provided in b)
      either have a single length, wherein the single length has a value in the range of from 3 mm to 12 mm, or
      have a length distribution, the average value of which is in the range of from 3 mm to 12 mm.

2. A process according to claim 1, wherein the p-aramid pulp in the suspension provided in a) is obtained by at least one refining step.

3. The process according to claim 1, wherein the p-aramid pulp in the suspension provided in a) has a specific surface area in the range of from about 5 m$^2$/g to 15 m$^2$/g.

4. The process according to claim 1, wherein in d), the mixed mass is guided via a passage through a refiner on the dewatering device.

5. The process according to claim 1, wherein the chopped fibers in the suspension provided in b)
   either have a single length, wherein the single length has a value in the range of from 5 mm to 12 mm, or
   have a length distribution, the average value of which is in the range of from 5 mm to 12 mm.

6. The process according to claim 5, wherein the chopped fibers in the suspension provided in b) exhibit a circular cross-section having a diameter in the range of from 4 μm to 50 μm.

7. The process according to claim 1, wherein the suspension provided in a), and/or the suspension provided in b), and/or the mixed mass yielded from c) comprises a filler.

8. The process according to claim 1, wherein the dried intermediate resulting from e) exhibits a water content in the range of from 0 wt. % to 20 wt. %.

9. The process according to claim 1, wherein the opening device used in f) is an impact mill, a mill using turbulent air, or a high shear/high agitating mixer.

10. The process according to claim 1, wherein a) to f) are conducted in a single continuous process.

11. A process to manufacture a mixture of p-aramid pulp with p-aramid chopped fibers, wherein the process comprises:
   a) providing a suspension comprising p-aramid pulp in water,
   b) providing a suspension comprising p-aramid chopped fibers in water,
   c') guiding the suspension from a) and the suspension from b) into a mixing device, wherein the suspensions are mixed to yield a mixed mass having a solid content of p-aramid pulp and p-aramid chopped fibers in the range of from 50 wt. % to 95 wt. % of p-aramid pulp and of from 5 wt. % to 50 wt. % of p-aramid chopped fibers, and
   d') guiding the mixed mass through a refiner and thereafter on a dewatering device, whereupon the mixed mass is dewatered to yield a dewatered cake,
   wherein the chopped fibers in the suspension provided in b)
      either have a single length, wherein the single length has a value in the range of from 3 mm to 12 mm, or
      have a length distribution, the average value of which is in the range of from 3 mm to 12 mm.

12. The process according to claim 11, further comprising
   e') the dewatered cake resulting from d') is guided either
      i') directly, or
      ii') via a passage through a cake breaker into a drying atmosphere to yield a dried intermediate, and
   f) the dried intermediate is guided either
      i') directly, or
      ii') via a passage through a homogenizing device
      into an opening device, wherein the dried intermediate is opened to arrive at an opened mixture of p-aramid pulp with p-aramid chopped fibers.

* * * * *